Patented Feb. 20, 1951

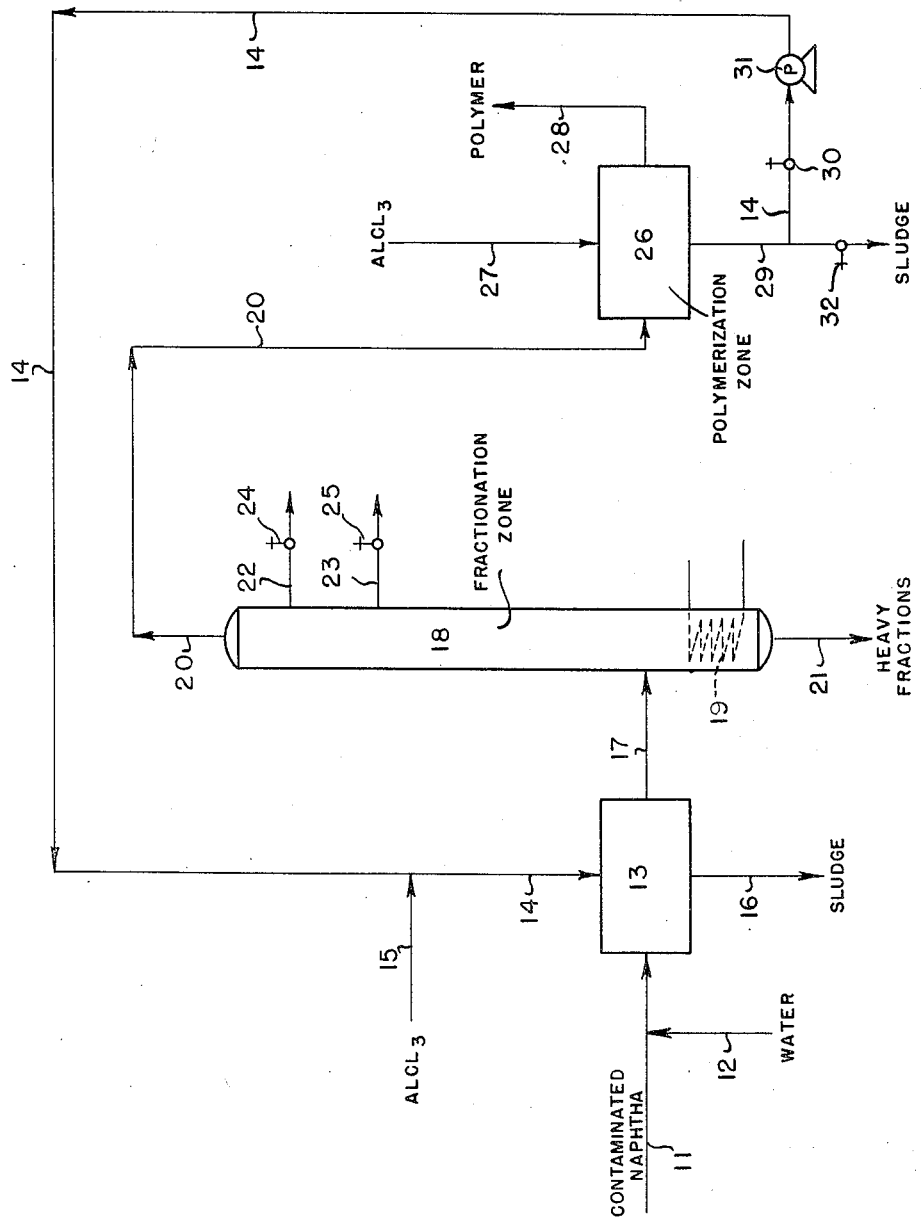

2,542,516

UNITED STATES PATENT OFFICE 2,542,516

TREATMENT OF NAPHTHA CONTAINING OXYGENATED BODIES

Raymond L. Heinrich, Baytown, Tex., assignor, by mesne assignments, to Standard Oil Development Company, Elizabeth, N. J., a corporation of Delaware Application October 11, 1947, Serial No. 779,285

6 Claims. (Cl. 260—683.15)

The present invention is directed to a method for preparing a lubricating oil by polymerization of olefins. More particularly, the invention is directed to a method for polymerizing olefins from olefins which are contaminated with oxygenated organic compounds, such as the olefins contained in the naphtha obtained from the synthesis of hydrocarbons and oxygenated organic compounds from carbon monoxide and hydrogen.

It is well known in the literature that the product produced from the so-called Fischer-Tropsch process, developed by these pioneers in Germany a number of years ago, contains hydrocarbons such as paraffins and olefins, as well as oxygenated organic compounds including acids, alcohols, aldehydes, ketones, esters, and the like. A considerable quantity of water is also produced in the reaction. The oxygenated organic compounds, including the acids, alcohols, aldehydes, ketones, and esters, distribute themselves, according to solubility, between the hydrocarbon and water layers produced in the reaction. Thus, the oxygenated organic compounds more nearly like the hydrocarbons dissolve in the hydrocarbons while those more nearly like water dissolve in the water. As it is well known, the oxygenated organic compounds are valuable materials and there is a large demand for them on the market. In admixture with hydrocarbons, however, they are unavailable as chemicals, and, besides, they interfere with the reactions to which the hydrocarbons may be subjected. For example, the product obtained by the reaction of carbon monoxide and hydrogen over an iron-type catalyst contains appreciable quantities of alpha olefins in addition to the oxygenated organic compounds mentioned before. These alpha olefins are preferential feed stocks for polymerization in the presence of a Friedel-Crafts type catalyst to high molecular weight polymers having lubricating oil characteristics. The oxygenated organic compounds, however, which are associated with the olefins interfere with the polymerization reaction by reacting with the olefins in the presence of the catalyst of the type mentioned before to form products having poor lubricating oil qualities. Furthermore, the oxygenated organic compounds are quite reactive with Friedel-Crafts type catalysts, such as aluminum halides. Thus, inferior quality lubricating oil polymers are produced from the oxygenated organic compounds which are present with the alpha olefins employed as the polymer feed stock, and the quantity of catalyst consumed is increased by the deleterious reactions of the oxygenated organic compounds with aluminum halides, for example. It will thus be seen that the operator has large quantities of these alpha olefins produced in the synthesis of hydrocarbons from carbon monoxide and hydrogen over an iron-type catalyst and there is a real problem before him in making these alpha olefins suitable for polymerization.

It is generally accepted that the crude petroleums in the continental United States suitable for making high grade lubricating oils are becoming increasingly scarce. Thus, the Pennsylvania crude oils and those from the Panhandle in Texas demand and obtain premium prices because of the scarcity of crude oils containing natural lubricants of high grades. The refiner of petroleum is, therefore, continually seeking other sources of high grade lubricating oils and naturally he has turned to the synthesis of products having the qualities which the motorists demand for use in the modern engine. It will thus be seen from the foregoing discussion that the production of premium grade lubricating oils from the alpha olefins produced in the synthesis of hydrocarbons from carbon monoxide is a real and important problem.

It is, therefore, the main object of the present invention to provide a method for polymerizing the alpha olefins formed in the synthesis of carbon monoxide and hydrogen to produce lubricating oils of high quality.

Another object of the present invention is to provide a method for treating a product from a Fischer-Tropsch synthesis reaction which, upon polymerization, will form a polymer having improved lubricating oil qualities.

The objects of the present invention are achieved by contacting a naphtha fraction containing olefins and contaminated with oxygenated and other compounds with an aluminum chloride sludge in the presence of water, following which the sludge is separated and the hydrocarbon is distilled to recover a fraction which is suitable for polymerization to lubricating oil polymer.

Briefly then, the invention may be described as involving the contact of a naphtha containing olefins and contaminated with oxygenated organic compounds of the type mentioned before and other organic compounds with aluminum chloride sludge or with aluminum chloride itself in the presence of water under conditions to form a sludge which is separated from the hydrocarbon. The hydrocarbon is then subjected to a distillation operation to recover a fraction which is substantially free of bodies which interfere with the polymerization reaction of the olefins in the presence of a Friedel-Crafts type catalyst. Following the separation of the overhead fraction, this fraction is contacted with aluminum chloride, for example, and subjected to polymerization conditions to form a polymer from which a lubricating oil polymer may be separated. The sludge formed in this operation may then be recycled to contact the contaminated naphtha as is or in admixture with fresh aluminum chloride. The contaminated naphtha and aluminum chloride has added to it water in an amount corresponding to between 0.1 to 2 mols of water per mol of aluminum chloride in contact with the naphtha.

In practicing the present invention, a contaminated naphtha of the type obtained by the reaction of carbon monoxide and hydrogen over an iron-type catalyst may be employed as the feed stock. This contaminated naphtha may have a composition as shown in the following table.

Table

Analysis, wt. per cent functional group:
- OH ---------------------------------- 0.60
- CHO --------------------------------- 0.36
- COOH -------------------------------- 1.70
- COO --------------------------------- 1.95
- CO ---------------------------------- 1.65

Bromine No., olefin types:
- Trans ------------------------------- 6.5
- Alpha ------------------------------- 68.4
- Tertiary ---------------------------- 6.9
- Cis --------------------------------- 3.9
- Tetra-substituted ethylenes --------- 0.1

The naphtha, having an analysis which is typified by the analysis of the foregoing table, may have water added to it in an amount in the range specified, and then contacted with aluminum chloride sludge produced in a later stage in the process or with fresh aluminum chloride. The water may be added to the naphtha or it may be introduced in admixture with the naphtha and aluminum chloride, or it may be added to the aluminum chloride or the aluminum chloride sludge, depending upon which is used as the treating reagent.

The temperature at which the treating reaction takes place ordinarily will be substantially atmospheric temperature. However, temperatures as high as 150° F. may be employed. Usually a temperature in the range from about 60° to 150° F. may be used in the pretreating step, but preferably a temperature in the range between 60° and 100° F. will be used.

The sludge separated from the naphtha may be discharged or it may be treated to recover the valuable halides and other compounds remaining in the sludge. After the naphtha has been separated from the sludge, it may be washed with water, if desired, and neutralized with an alkaline solution to neutralize the acidic bodies which may remain associated with the naphtha. After the washing and neutralization treatment, the treated naphtha may be distilled to recover a fraction containing alpha olefins and uncontaminated with bodies which deleteriously affect the polymerization reaction. The overhead fraction then may be subjected to a polymerization operation in the presence of a Friedel-Crafts catalyst under conditions to cause polymerization to polymers having lubricating oil qualities. The polymerization may be conducted at a temperature in the range between 75° and up to 250° F., but preferably it will be conducted at temperatures in the range of 75° to 175° F. Following the polymerization reaction, the hydrocarbon is separated from the sludge which forms as a result of the reaction and the hydrocarbon may be subjected to a distillation operation to separate the desired polymer.

The invention will now be further illustrated by reference to the drawing in which the sole figure is a flow diagram of a preferred mode thereof. Referring now to the drawing, numeral 11 designates a feed line to which a contaminated naphtha, such as one boiling in the range between 110° and 400° F. containing olefins in admixture with paraffin hydrocarbons and contaminated with oxygenated organic compounds, is introduced into the system. The contaminated naphtha in line 11 has added to it by line 12 an amount of water in the range of 0.1 to 2 mols of water per mol of aluminum chloride which will be contacted with the contaminated naphtha in a manner to be described. The contaminated naphtha in admixture with the water is then discharged by line 11 into a treating zone 13 which may be a suitable countercurrent treating tower or which may be a reactor or other suitable equipment in which contact may be made between the contaminated naphtha and the aluminum chloride introduced into treating zone 13 by line 14. Line 14 introduces aluminum chloride either as a sludge formed in a later stage in the process or as aluminum chloride itself introduced by line 15 into line 14. Treating zone 13 is provided with suitable contacting equipment to insure intimate admixture between the contaminated naphtha and aluminum chloride. As a result of the reaction between the contaminated naphtha and aluminum chloride, a sludge is produced which is separated in treating zone 13 from the treated naphtha. The sludge is withdrawn from the system by line 16 and discarded or suitably treated to recover the constituents thereof.

The naphtha separated from the sludge in treating zone 13 is withdrawn therefrom by line 17 and discharges thereby into a fractionation zone 18 which is shown as a single distillation tower. It will be understood, of course, that fractionation zone 18 may be a series of distillation towers. However, for purposes of simplification of the description, it is preferably shown as a single distillation tower which is understood to be equipped with suitable internal equipment such as bell cap trays and other contacting equipment to insure intimate contact between vapors and liquids. Fractionation zone 18 is also provided with heating means illustrated by coil 19 by means of which temperature and pressure conditions may be adjusted. Conditions are adjusted in fractionation zone 18 to obtain an overhead fraction by line 20 and a bottoms fraction by line 21. Ordinarily the overhead fraction obtained by line 20 will have a boiling range approximating the boiling range of the contaminated naphtha introduced by line 11, and the heavy fractions discharged by line 20 will include heavy polymeric bodies or tarry material formed in the reaction in treating zone 13. Alternatively, rather than obtain only two fractions by lines 20 and 21, it may be desired to obtain other fractions and, therefore, provision is made to withdraw from fractionation zone 18, if desired, side streams by lines 22 and 23. These lines are controlled, respectively, by valves 24 and 25.

Assuming for purposes of description that a fraction corresponding to about 80° of the naphtha introduced into fractionation zone 18 by line 17 is obtained by line 20 and this fraction is introduced into polymerization zone 26 into which aluminum chloride may be introduced by line 27. The conditions are adjusted in polymerization zone 26 to cause polymerization of the olefins in the fraction introduced by line 20 to form a polymer having desirable lubricating oil qualities. These conditions embrace the temperature conditions recited before. It will be understood that polymerization zone 26 may be a countercurrent treating tower or a batch reactor equipped with agitating means to insure contact between the olefins in the stream introduced by line 20 and aluminum chloride introduced by line 27. The polymer withdrawn from polymerization zone 26 by line 28 contains a high molecular weight fraction which has lubricating oil qualities and may be suitably recovered by distillation in a distillation zone not shown. The sludge formed during the polymerization reaction of the aluminum chloride with the olefins in the fraction introduced by line 20 is withdrawn from polymerization zone 26 by line 29 and may be recycled to treating zone 13 through line 29 and line 14 controlled by valve 30 and containing pump 31.

Under some conditions, it may be desirable to discard some of the sludge withdrawn by line 29 and this may be done by opening valve 32. Similar to the sludge withdrawn by line 16, the sludge withdrawn by line 29 may be treated in a suitable manner well known to the art to recover the constituents thereof.

It will be seen from the foregoing description taken with the drawing that a simple, readily available process is provided in which a contaminated naphtha containing olefins and oxygenated organic compounds is treated with the sludge from a polymerization process or with fresh portions of the catalyst in which a small amount of water is present in the naphtha. Just what the function of the water is in the pretreating step is not clearly understood. However, it is postulated that the presence of the water during the treating reaction which takes place in treating zone 13 results in the reaction of the several deleterious components of the fresh feed with aluminum chloride contained in the spent sludge or with aluminum chloride which may be introduced into treating zone 13. It is postulated that the reaction which takes place may include suppression of the isomerization of alpha olefins to undesirable beta olefins. It is believed further that the reaction includes preferential reaction of the aluminum chloride constituents with the oxygenated organic compound constituents present in the fresh feed. It is surprising indeed that the presence of a small amount of water in the treating zone should effect to such a marked degree the polymerization reaction in polymerization zone 26.

These surprising results are illustrated in the following example in which a naphtha boiling in the range from about 110° to 400° F. and obtained by the reaction of carbon monoxide and hydrogen over an iron catalyst was treated in accordance with the present invention. 1000 volumes of the naphtha having the foregoing boiling range and containing oxygenated organic compounds in admixture with alpha and other olefins were treated with 15 parts by weight of aluminum chloride, to which no water had been added, at substantially atmospheric temperature. As a result of the reaction taking place, sludge was separated and the hydrocarbon was distilled to recover a fraction corresponding to 728 volumes. 200 volumes of this overhead fraction were then contacted for 2 hours in the presence of 12 parts by weight of aluminum chloride at 100° F. A polymer was obtained which corresponded to a yield of 29.0 weight per cent of the naphtha charged. This polymer was tested and found to have a viscosity at 210° F., S. S U., of 59.3, a viscosity at 100° F., S. S. U., of 487, and a viscosity index of 79.

In a second run, 1000 volumes of the identical naphtha employed in the first run was contacted at substantially atmospheric temperature with 15 parts by weight of aluminum chloride to which had been added 1.5 parts by weight of water. A sludge was formed which was separated and the naphtha recovered was washed with water and distilled to recover 708 volumes. 200 volumes of this overhead fraction was then contacted for 2 hours with 12 parts by weight of aluminum chloride at 100° F. The lubricating oil polymer separated from the product corresponded to 29.4 weight per cent of naphtha charged. This polymer was subjected to tests to determine its characteristics and it was found that it had a viscosity at 210° F., S. S. U., of 54.7, a viscosity at 100° F. of 375, S. S. U., and a viscosity index of 84.

It will be seen from the foregoing runs that, although a smaller amount of treated naphtha was recovered in the run in accordance with the present invention than in conventional operations, the yield of lubricating oil polymer was substantially the same. It will also be apparent that the product produced in accordance with the present invention has a substantially higher viscosity index than the product obtained from conventional operations when no water was present. It will be further apparent that an improved result is obtained in the practice of the present invention.

The invention has been described and illustrated by examples in which aluminum chloride has been used as the treating reagent and as the polymerization reagent. It will be apparent to the skilled worker that other Friedel-Crafts type catalyst may be used in lieu of aluminum chloride. As exemplary of other catalysts which may be used may be mentioned ferric chloride, titanium chloride, boron trifluoride, zirconium chloride, other aluminum halides besides aluminum chloride, and many other Friedel-Crafts type catalysts well known to the art.

The nature and objects of the present invention having been completely described and illustrated, what I wish to claim as new and useful and to secure by Letters Patent is:

1. A method for producing a lubricating oil polymer from a naphtha containing olefins and contaminated with oxygenated organic compounds which comprises contacting a naphtha containing olefins and contaminated with oxygenated organic compounds with a Friedel-Crafts catalyst in the presence of water in an amount in the range between 0.1 and 2.0 mols per mol of catalyst at a temperature no greater than 150° F. to form a reaction product, separating a hydrocarbon fraction from said reaction product and subjecting said separated hydrocarbon to polymerization at a temperature in the range between 75° and 250° F. in the presence of a Friedel-Crafts catalyst to form a polymer having lubricating oil qualities, and recovering said polymer.

2. A method in accordance with claim 1 in which the catalyst is aluminum chloride.

3. A method for producing a synthetic lubricating oil which comprises contacting a naphtha contaminated with oxygenated organic compounds and containing olefins with an active aluminum halide containing sludge in the presence of water in an amount in the range between 0.1 to 2 mols of water per mol of aluminum halide in said sludge at a temperature in the range between 60° and 150° F. to form a reaction product, separating reaction product from the naphtha, and subjecting the separated naphtha to distillation conditions to obtain a fraction having a boiling range approximating the boiling range of the contaminated naphtha, subjecting said fraction to polymerization in the presence of an aluminum halide catalyst at a temperature above the contacting temperature to form a polymer having lubricating oil properties and an aluminum halide sludge, separating said polymer from the aluminum halide sludge formed in said polymerization reaction, recovering said polymer and contacting additional quantities of said contaminated naphtha with said aluminum halide sludge separated from said polymer.

4. A method in accordance with claim 3 in which the aluminum halide is aluminum chloride.

5. A method for producing a synthetic lubricating oil which comprises contacting a naphtha contaminated with oxygenated organic compounds and containing olefins at a temperature in the range between 60° to 150° F., with aluminum chloride in the presence of water in an amount in the range between 0.1 to 2 mols of water per mol of aluminum chloride to form a reaction product with said aluminum chloride, separating reaction product from said naphtha, washing the separated naphtha with water, distilling the washed naphtha to recover a fraction having a boiling range substantially the same as the boiling range of the contaminated naphtha, contacting said fraction with aluminum chloride at a temperature in the range between 75° and 250° F. to form a polymer having lubricating oil properties and aluminum chloride sludge, separating said polymer from said sludge, and recovering a lubricating oil fraction from said polymer.

6. A method for producing a synthetic lubricating oil which comprises contacting a feed naphtha boiling in the range between 110° and 400° F. contaminated with oxygenated organic compounds and containing olefins at substantially atmospheric temperature with 15 parts by weight of aluminum chloride to which has been added 1.5 parts by weight of water to form a sludge, separating sludge from said contacted naphtha, distilling said contacted naphtha to obtain a fraction boiling in the range of the feed naphtha, contacting the distilled fraction for about 2 hours with 12 parts by weight of aluminum chloride at 100° F. to form a polymer, separating aluminum chloride from said polymer, and recovering a lubricating oil from said polymer.

RAYMOND L. HEINRICH.

REFERENCES CITED

The following references are of record in the file of this patent:

UNITED STATES PATENTS

| Number | Name | Date |
|---|---|---|
| 2,040,658 | Kuentzel et al. | May 12, 1936 |
| 2,055,425 | Caudri | Sept. 22, 1936 |
| 2,165,372 | Haag et al. | July 11, 1939 |
| 2,165,373 | Hofmann et al. | July 11, 1939 |
| 2,346,527 | Warrick et al. | Apr. 11, 1944 |
| 2,378,733 | Sensel | June 19, 1945 |
| 2,406,778 | Kruse et al. | Sept. 3, 1946 |

FOREIGN PATENTS

| Number | Country | Date |
|---|---|---|
| 479,632 | Great Britain | Feb. 9, 1938 |